(12) United States Patent
Kuroda et al.

(10) Patent No.: US 7,639,904 B2
(45) Date of Patent: Dec. 29, 2009

(54) OPTICAL DEVICE

(75) Inventors: Toshihiro Kuroda, Tsukuba (JP); Rei Yamamoto, Tsukuba (JP); Shigeyuki Yagi, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 12/122,062

(22) Filed: May 16, 2008

(65) Prior Publication Data

US 2008/0226230 A1 Sep. 18, 2008

Related U.S. Application Data

(63) Continuation of application No. PCT/JP2006/322993, filed on Nov. 17, 2006.

(30) Foreign Application Priority Data

Nov. 18, 2005 (JP) .............................. 2005-334045

(51) Int. Cl.
*G02B 6/12* (2006.01)
(52) U.S. Cl. ............................. 385/14; 385/15; 385/31; 385/39; 385/49; 385/50
(58) Field of Classification Search .................. 385/14, 385/15, 31, 39, 49, 50
See application file for complete search history.

(56) References Cited

U.S. PATENT DOCUMENTS

| 5,234,772 | A | * | 8/1993 | Oguchi et al. ............. 428/473.5 |
| 6,503,421 | B1 | * | 1/2003 | Wang et al. .................. 252/582 |
| 6,904,220 | B2 | * | 6/2005 | Shimada et al. ............. 385/131 |
| 7,257,295 | B2 | * | 8/2007 | Yokouchi ..................... 385/39 |
| 2005/0100275 | A1 | * | 5/2005 | Kimura ........................ 385/31 |
| 2006/0126994 | A1 | * | 6/2006 | Higuchi et al. ................ 385/14 |
| 2006/0140546 | A1 | * | 6/2006 | Nakata et al. ................. 385/88 |
| 2007/0154145 | A1 | * | 7/2007 | Miyadera et al. .............. 385/49 |
| 2007/0248139 | A1 | * | 10/2007 | Bischel et al. ................ 372/75 |

FOREIGN PATENT DOCUMENTS

| JP | 01094305 | * | 4/1989 |
| JP | 01126608 | * | 5/1989 |
| JP | 08068917 | A | * | 3/1996 |

(Continued)

*Primary Examiner*—Ellen Kim
(74) *Attorney, Agent, or Firm*—Antonelli, Terry, Stout & Kraus, LLP.

(57) ABSTRACT

An optical device is provided to prevent a dicing blade form being clogged when a wafer is cut by means thereof. Further, an optical device is provided to the present invention can prevent unnecessary expansion of a resin used in the optical device. The present invention relates an optical device having a substrate and an optical waveguide layer laminated thereon. The optical waveguide layer has a first lateral surface connected to an optical fiber or an optical fiber array and a second lateral surface not connected to the same. The substrate has a lateral surface disposed on the same side as that of the second lateral surface of the optical waveguide layer. At least a portion of the second lateral surface of the optical waveguide layer is disposed in a plane different from the lateral surface of the substrate so that an exposed area of the substrate is formed between the second lateral surface of the optical waveguide layer and the lateral surface of the substrate.

6 Claims, 5 Drawing Sheets

FOREIGN PATENT DOCUMENTS

| | | |
|---|---|---|
| JP | 10-133041 | 5/1998 |
| JP | 11-109149 | 4/1999 |
| JP | 11109149 A * | 4/1999 |
| JP | 2001-281479 | 10/2001 |
| JP | 2002-022993 | 1/2002 |
| JP | 2006-330280 | 12/2006 |

* cited by examiner

OPTICAL DEVICE

This application is a Continuation application of International (PCT) Application No. PCT/JP2006/322993, filed Nov. 17, 2006, the contents of which are incorporated herein by reference in their entirety.

FIELD OF THE INVENTION

The present invention relates to an optical device having a substrate and an optical part, such as an optical waveguide, an optical filter and a lens, mounted on the substrate.

BACKGROUND OF THE INVENTION

A conventional optical device such as an optical waveguide device is generally manufactured by laminating an optical waveguide layer onto a substrate to arrange many optical device elements, such as optical waveguide device elements, in a wafer and cutting the wafer into the individual optical device elements by means of, for example, dicing (for example, please refer to Patent Publication 1 indicated below). A disc blade is typically used to cut the wafer.

FIG. 9 is a perspective view showing an example of such an optical device. An optical device 200 has a substrate 202 and an optical waveguide layer 204 laminated thereon. The waveguide layer 204 has first lateral surfaces 206a, 206b each of which an optical fiber F1 or an optical fiber array is connected to and second lateral surfaces 208 each of which such an optical fiber F1 or an optical fiber array is not connected to. The substrate 202 has also lateral surfaces 216 on the same sides as those of the second lateral surfaces 208 of the waveguide layer 204, and the second lateral surface 208 and the lateral surface 216 of the substrate 202 on the same side are located in a single plane. The waveguide layer 204 is made of polymer.

Further, an optical filter F2 is provided in the middle of the waveguide layer 204 in a light-propagating direction 210a. The filter F2 is inserted into an optical-filter-mounting groove 212 made in the waveguide layer 204 and the substrate 202 and fixed therein by means of a filter adhesive A2 filled into a gap 211 between the filter F2 and the filter-mounting groove 212. Further, a fiber adhesive A1 is filled into a gap 213 between the fiber F1 and the waveguide layer 204 and into an optical-fiber-coupling groove 214b across the substrate 202 in a transverse direction 210b at an end of the fiber F1. The filter adhesive A2 is a resin selected so that a refractive index thereof is close to that of a core 204a of the waveguide layer 204, while the fiber adhesive A1 is a resin selected so that a refractive index thereof is close to that of a core of the fiber F1.

Patent Publication 1: Japanese Patent Laid-open Publication No. 2001-281479

When the optical device 200 in the form shown in FIG. 9 is cut away from a wafer by means of a dicing blade, there is a problem that cutting dust formed of a material of the waveguide layer 204 are attached to the dicing blade so that the dicing blade tends to be clogged with the dust. This problem especially tends to happen when the waveguide layer 204 is made of polymer.

Further, when an uncured fiber adhesive A1 is dropped into the fiber-coupling groove 214b, the fiber adhesive A1 may flow into the filter-mounting groove 212. Specifically, a width of the fiber-coupling groove 214b is within a range of 50-300 μm, the lateral surface 216 of the substrate 202 is formed with a fine indented pattern by means of the dicing blade, and the gap 211 between the filter-mounting groove 212 and the filter F2 is within a range of 15-600 μm. In this connection, each of the groove 214b, the fine indented pattern and the gap 211 has a function of allowing the uncured resin (adhesive) to travel far away therealong. After the fiber adhesive A1 is dropped into the fiber-coupling groove 214b, the fiber adhesive A1 expands in the fiber-coupling groove 214b in the transverse direction 210b, travels along the fine indented pattern on the lateral surfaces 208, 216, reaches the filter-mounting groove 212 and enters it. In this case, since the refractive index of the fiber adhesive A1 is different from that of the filter adhesive A2, a reflective return light of the optical device 200 is possibly increased. Similarly, after the filter adhesive A2 is dropped into the filter-mounting groove 212, the filter adhesive A2 may enter the fiber-coupling groove 214b.

It is therefore the first object of the present invention to provide an optical device which can prevent a dicing blade form being clogged when a wafer is cut by means thereof Further, it is the second object of the present invention to provide an optical device which can prevent unnecessary expansion of a resin used in the optical device.

SUMMARY OF THE INVENTION

In the present invention, to accomplish the above-stated first object, the material of the waveguide layer can be shifted away from a dicing line, and thus the clogging of the dicing blade can be prevented.

In other words, the present invention is directed to an optical device comprises a substrate and an optical waveguide layer laminated thereon, wherein the optical waveguide layer has a first lateral surface connected to an optical fiber or an optical fiber array and a second lateral surface not connected to the same, the substrate has a lateral surface disposed on the same side as that of the second lateral surface of the optical waveguide layer, and at least a portion of the second lateral surface of the optical waveguide layer is disposed in a plane different from a plane in which the lateral surface of the substrate is disposed so that an exposed area of the substrate is formed between the second lateral surface of the optical waveguide layer and the lateral surface of the substrate.

In this optical device, although the lateral surface of the substrate is formed by a cutting action by means of the dicing blade, since at least the portion of the second lateral surface of the waveguide layer is located in a plane different from a plane in which the lateral surface of the substrate is located to form the exposed area of the substrate, the dicing blade does not contact the material of the waveguide layer during the cutting action by means of the dicing blade. Thus, the clogging of the dicing blade caused by the cutting dust of the material such as polymer can be prevented.

Further, after the fiber adhesive (uncured resin) is dropped into the fiber-coupling groove, it expands in the fiber-coupling groove in the transverse direction and then it flows into the exposed area between the second lateral surface and the lateral surface of the substrate without traveling along the second lateral surface of the waveguide layer and the lateral surface of the substrate. The exposed area does not have a function of allowing an uncured resin to travel far away. Thus, the fiber adhesive is prevented from entering the filter-mounting groove so that unnecessary expansion of the resin can be prevented. As a result, the above-stated second object can be accomplished. An operation after the filter adhesive (uncured resin) is dropped into the filter-mounting groove is similar to that after the fiber adhesive is dropped into the fiber-coupling groove.

In the optical device according to the present invention, preferably, the second lateral surface of the optical waveguide layer is substantially planar.

In the optical device according to the present invention, preferably, the second lateral surface of the optical waveguide layer has a concavo-convex configuration.

In this optical device, even if the adhesive used to mount an optical fiber, optical fibers or an optical fiber array flows onto the exposed area, the concavo-convex configuration on the second lateral surface of the optical layer can prevent the adhesive from traveling so that the concavo-convex configuration functions as a dam for the adhesives.

In this optical device, preferably, the exposed area of the substrate is interrupted by the concavo-convex configuration.

Further, in the optical device according to the present invention, preferably, the substrate has, on the same side as that of the first lateral surface, a portion on which the optical waveguide layer is not laminated, and which is provided with a groove for mounting an optical fiber thereinto.

Further, in the optical device according to the present invention, preferably, the optical waveguide layer is provided with a groove for mounting an optical filter thereinto.

Further, the optical device according to the present invention, preferably, further comprises an optical filter.

Further, in the optical device according to the present invention, preferably, the waveguide layer is a polymer layer.

Further, to accomplish the above-stated second object, an optical device according to the present invention comprises a substrate, an optical part mounted on the substrate, a resin-filled portion which is formed in the substrate and into which a resin is filled, and a concave section communicating with the resin-filled portion and storing the resin.

In this optical device, after a resin is dropped into the resin-filled portion provided in the substrate, it expands in the resin-filled portion and then flows into a concave section for storing the resin. Since the concave section does not have a function of allowing the resin to travel far away, unnecessary expansion of the resin can be prevented.

In the optical device according to the present invention, preferably, the optical part includes a lens or an optical waveguide and an optical filter, the lens or the optical waveguide is optically coupled to an optical fiber, the resin-filled portion has a first groove across the substrate at a coupling portion where the optical fiber is coupled to the lens or the optical waveguide and a second groove which is formed across the substrate for mounting the optical filter thereinto, and the concave section is formed at an end of at least one of the first and second grooves.

In this optical device, after an uncured resin (adhesive) is dropped into the first groove, it expands in the first groove in the transverse direction. Then the uncured resin flows into the concave section provided at the end of the first groove without traveling along the lateral surface of the substrate, or it flows into a concave section provided at the end of the second groove after it travels along the lateral surface of the substrate. Since the concave section does not have a function of allowing the uncured resin to travel far away, the resin can be prevented from entering the second groove. As a result, unnecessary expansion of the resin can be prevented. An operation after an uncured resin (adhesive) is dropped into the second groove is similar to that after such an uncured resin (adhesive) is dropped into the first groove.

In the optical device according to the present invention, preferably, the optical part includes a lens or an optical waveguide optically coupled to an optical fiber, the resin-filled portion is a first groove across the substrate at a coupling portion where the optical fiber is coupled to the lens or the optical waveguide, and the concave section is formed adjacent to at least a portion of the first groove.

In this optical device, after the uncured resin (adhesive) is dropped into the first groove, it expands in the first groove in the transverse direction or it is raised from the first groove, to flow into the concave section. If the optical part is a lens, the resin can be prevented from being interposed between the optical fiber and the lens. Further, if the optical part is an optical waveguide, unnecessary expansion of the resin can be prevented. Please note that although the wording "first groove" is used in this embodiment, it is assumed that it is not necessary for this embodiment to include a second groove.

In the optical device according to the present invention, preferably, the optical part includes a lens or an optical waveguide optically coupled to an optical fiber and further includes an optical filter, the resin-filled portion includes a second groove which is formed across the substrate for mounting the optical filter in the second groove, and the concave section is formed adjacent to at least a portion of the second groove.

In this optical device, when the optical part is a lens, a resin filled into the gap between the second groove into which the filter is mounted and the filter is overflowed from the second groove so that, first, it is raised on the substrate. If the resin were cured in this state, a light output from the lens would come into the raised resin rather than the filter. However, the resin subsequently flows into the concave section provided adjacent at least the portion of the second groove so that the resin overflowed from the second groove returns into the gap 11. Thus, unnecessary expansion of the resin can be prevented. Further, when the optical part is an optical waveguide, after an uncured resin (adhesive) is dropped into the second groove, it expands in the transverse direction or it is raised from the second groove to flow into the concave section. This can prevent unnecessary expansion of the resin. It should be noted that although the wording "second groove" is used, it is assumed that it is not necessary for this embodiment to include a first groove.

As explained above, the optical device according to the present invention can prevent a dicing blade from being clogged when a wafer is cut by means thereof.

Further, the optical device according to the present invention can prevent unnecessary expansion of a resin used in the optical device.

DETAILED DESCRIPTION OF THE PREFERRED EMBODIMENTS

Figure 1:
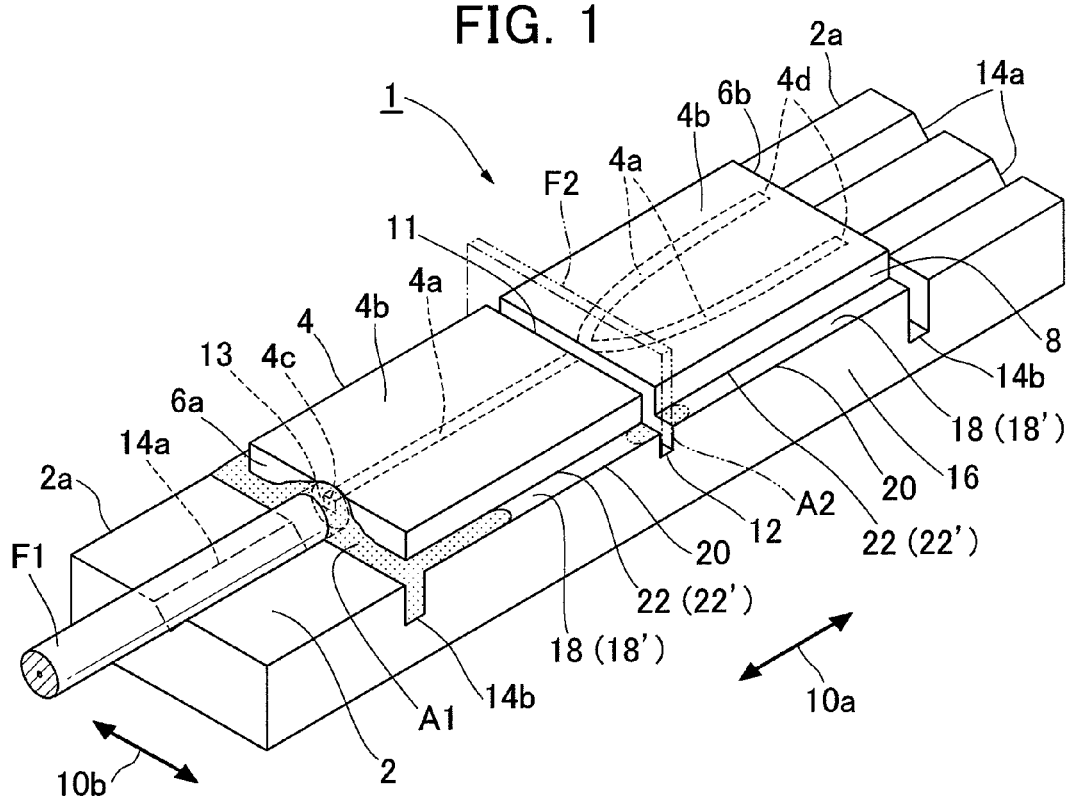
FIG. 1 is a perspective view of an optical device according to the first embodiment of the present invention.

Now, referring to FIG. 1, an optical device according to a first embodiment of the present invention will be explained. FIG. 1 is a perspective view of such an optical device according to the first embodiment of the present invention.

As shown in FIG. 1, an optical device 1 is manufactured by cutting a wafer (not shown) provided with a substrate 2 and an optical waveguide layer 4 laminated thereon. In FIG. 1, an optical fiber F1 is mounted on the optical device 1 and an optical filter F2 to be mounted into the waveguide layer 4 is drawn by dashed-two dotted lines.

The waveguide layer 4 is partially formed on the substrate 2 in a generally rectangular form, and has two first lateral surfaces 6a, 6b to be connected to respective optical fibers or optical fiber arrays, and two second lateral surfaces 8 to which such optical fibers or optical fiber arrays are not connected. The first lateral surfaces 6a, 6b are spaced with respect to each other in a light-propagating direction 10a and each of the first lateral surfaces extends in a transverse direction 10b, while each of the second lateral surfaces 8 extends in the light-propagating direction 10a. In this embodiment, the waveguide layer 4 is divided into two parts by the filter F2.

Further, the waveguide layer 4 has a core 4a and a cladding 4b, the core 4a and the cladding 4b forming an optical waveguide which is a kind of optical part. The core 4a has a port 4c disposed on the first lateral surface 6a on one side of the optical device and ports 4d disposed on the first lateral surface 6b on the other side of the optical device, and is configured to propagate light between the port 4c and the ports 4d. In this embodiment, the number of the ports 4c on the one side of the optical device is one, while the number of the ports 4d on the other side of the optical device is two, and the waveguide defines a multiplexing portion. The waveguide layer 4 is preferably made of polymer.

In the waveguide layer 4 and the substrate 2, an optical-filter-mounting groove 12 extending across the core 4a in the transverse direction 10b for mounting the filter F2 is provided between the port 4c on the one side and the ports 4d on the other side. A filter adhesive A2 is used inside of the filter-mounting groove 12 to mount the filter F2 thereinto. The filter adhesive A2 is preferably selected so that a refractive index thereof is close to that of the core 4a.

The filter adhesive A2 is generally a resin. Thus, a gap 11 between the filter F2 and the filter-mounting groove 12 defines a resin-filled portion 11 to be filled with a resin.

The substrate 2 has extended sections 2a extending on the opposite sides of the waveguide layer 4 in the light-propagating direction 10a, and each extended section 2a has fiber-mounting grooves 14a, 14b for mounting the fiber F1. In this embodiment, there are a V-shaped groove 14a having a V-shaped cross section for positioning the fiber F1 to be aligned with the port 4c (4d), and a fiber-coupling groove 14b disposed between the V-shaped groove 14a and the waveguide layer 4 and extending in the transverse direction 10b. The fiber-coupling groove 14b is located below an optical coupling portion or location between the waveguide layer 4 and the fiber F1 and close to the waveguide layer 4. In order to fix the fiber F1 to the substrate 2, a fiber adhesive A1 is used inside of the fiber-coupling grooves 14b. The fiber adhesive A1 is preferably selected so that a refractive index thereof is close to that of the core of the fiber F1. The substrate 2 is preferably formed of silicon. It should be noted that, in FIG. 1, only the fiber F1 on the one side of the optical device is shown, while such fibers F1 on the other side of the optical device are omitted.

The fiber adhesive A1 is generally a resin. Thus, a gap 13 between the fiber F1 and the waveguide layer 4 and the fiber-coupling groove 14b near the gap 13 define a resin-filled portion to be filled with a resin.

Further, the substrate 2 has lateral surfaces 16 disposed on the same sides of the optical device as those of the second lateral surfaces 8 of the waveguide layer 4. Each of the lateral surfaces 16 of the substrate 2 and the corresponding second lateral surfaces 8 of the waveguide layer 4 are located in respective planes different from each other so that an exposed area 18 of the substrate 2 exposed upward is formed between the former lateral surface 16 and the latter lateral surface 8, namely, a step 18' is formed. The lateral surface 16 of the substrate 2 is a cut surface formed when the wafer (not shown) is cut in a cutting direction 10a by means of a dicing blade to separate the optical device 1 from the wafer. The lateral surface 16 of the substrate 2 has an upper edge 20, a part of which extends from the fiber-coupling groove 14b to the filter-mounting groove 12. Further, the second lateral surface 8 of the waveguide layer 4 is substantially planar. There is a boundary line 22 between the second lateral surface 8 and the exposed areas 18 of the substrate 2; namely, an inner edge of the step 18' which is straight and a part of which extends from the fiber-coupling groove 14b to the filter-mounting groove 12.

As explained later, the step 18' communicates with the resin-filled portions 11, 13 and defines a concave section for storing a resin in such a state that the resin does not fill the concave section.

Next, an example of a method of manufacturing the optical device 1 according to the first embodiment of the present invention and assembling the fiber F1 and the filter F2 into the optical device 1 will be explained.

At first, the substrate 2 is formed with the V-shaped grooves 14a. Then, the cladding 4b and the core 4a are laminated accordingly over the substrate 2, the core 4 is partially removed so that necessary portions thereof remain, and the cladding 4b is further laminated. Then the cladding 4b is partially removed so that the waveguide layers 4 remain. Then, the filter-mounting grooves 12 and the fiber-coupling grooves 14b are formed by means of a dicing blade. Lastly, using a dicing blade, the wafer (not shown) is cut along the dicing lines extending in the light-propagating direction 10a or in the transverse direction 10b to make the individual optical devices 1. Since the above-stated steps are performed by using a conventional method, detailed explanations thereof are omitted.

Next, the fiber F1 is positioned into the V-shaped groove 14a, and fixed to the substrate 2 by using the fiber adhesive A1, for example, a thermo curable silicone resin. The fiber adhesive A1 is filled inside of the V-shaped groove 14a, the fiber-coupling groove 14b and the gap 13 between the fiber F1 and the core 4a of the waveguide layer 4.

Finally, the filter F2 is mounted into the filter-mounting groove 12, and fixed thereto by means of the filter adhesive A2, for example, a cation curable silicone resin. The filter adhesive A2 is filled inside of the gap 11 between the filter F2 and the core 4a of the waveguide.

It should be noted that the order of the steps for filling the fiber adhesive A1 and the filter adhesive A2 can be reversed.

According to the above-stated optical device 1, regarding the adjacent optical devices, the opposing second lateral surfaces 8 therebetween are formed so that a distance between said lateral surfaces 8 is greater than a width of the dicing blade. Thus, when the dicing blade cuts the wafer along the dicing line in the light-propagating direction 10a, since the dicing blade does not contact the cladding 4b, cutting dust of the cladding 4b is not created. As a result, the clogging of the dicing blade can be prevented.

Further, in the optical device 1 according to the first embodiment of the present invention, after the fiber adhesive (uncured resin) A1 is dropped into the fiber-coupling groove 14b, it expands in the fiber-coupling groove 14b in the transverse direction 10b, but it does not travel thereafter along the second lateral surface 8 of the waveguide layer 4 and the lateral surface 16 of the substrate 2, and instead it flows into the concave section 18' or the exposed area 18 between the second lateral surface 8 and the lateral surface 16 of the substrate 2. The exposed area 18 does not have a function of allowing the fiber adhesive A1 to travel far away. Thus, the fiber adhesive A1 is prevented from entering the filter-mounting groove 14b so that unnecessary expansion of the resin can be prevented. Specially, when the refractive indexes of the fiber adhesive A1 and the filter adhesive A2 are selected to respectively correspond to those of the core of the fiber F1 and the core 4a of the waveguide layer 4, a reflective return light of the optical device 1 can be prevented from increasing more than a design level thereof.

Specifically, a strength R of the reflective return light at the filter F2 is described as follows;

$$R = 10 \times \log_{10} \frac{(n1 - n2)^2}{(n1 + n2)^2} \quad \text{Equation (1)}$$

where n1 indicates a refractive index of the adhesive and n2 indicates a refractive index of the core 4a of the waveguide 4 and equals, for example, 1.525. In these design, the filter adhesive A2 having a refractive index of 1.500 is disposed in the gap 11 between the core 4a and the filter F2. In this conditions, the strength R of the reflective return light equals −42 dB which fulfills the need in the field of optical device or the requirement under −40 dB. However, if the fiber adhesive A1 having a refractive index of 1.455 is disposed in the gap 11 between the core 4a and the filter F2, the strength R of the reflective return light would equal −33 dB, which means that the reflective return light is increased.

Figure 2:
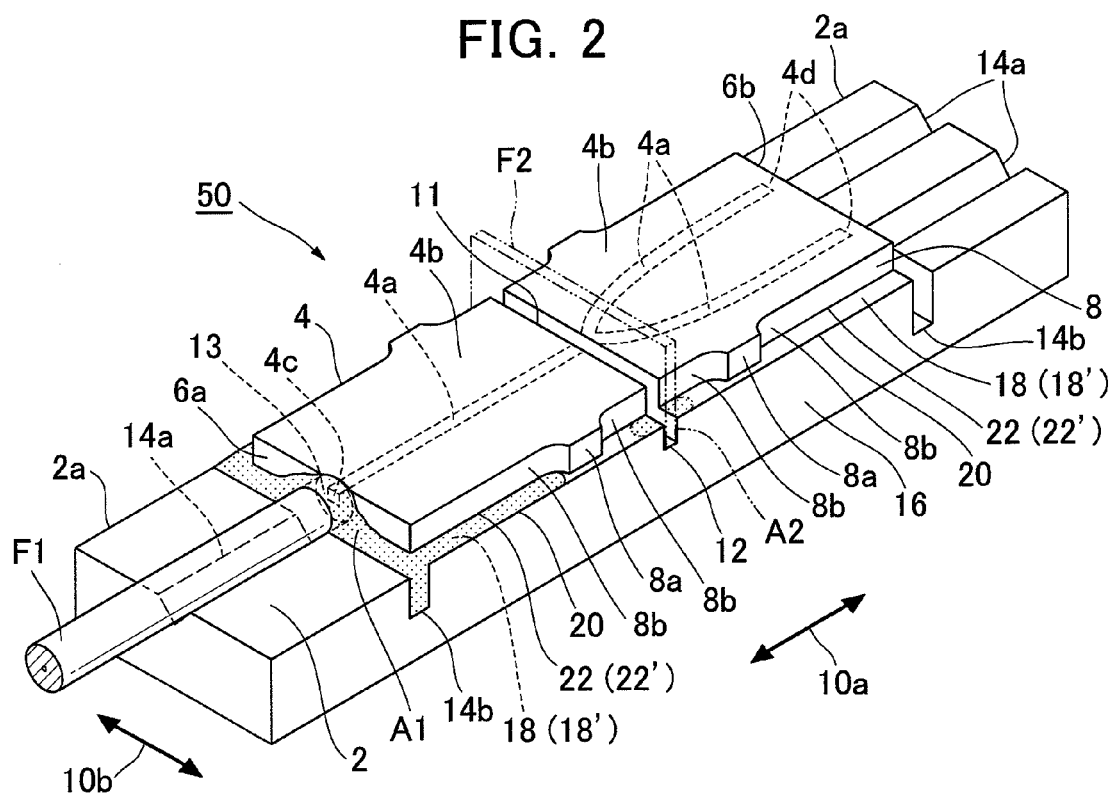
FIG. 2 is a perspective view of an optical device according to the second embodiment of the present invention.

Next, referring to FIG. 2, an optical device according to a second embodiment of the present invention will be explained. FIG. 2 is a perspective view of such an optical device according to the second embodiment of the present invention.

As shown in FIG. 2, an optical device 50 according to the second embodiment of the present invention has a structure similar to that of the optical device 1 according to the first embodiment of the present invention except that the second lateral surface 8 of the waveguide layer 4 includes a concavo-convex configuration defined by a convex section 8a and concave sections 8b. In this connection, components of the optical device 50 according to the second embodiment of the present invention similar to those of the optical device according to the first embodiment thereof are indicated by the same reference numbers as those of the latter components, and thus explanations of the former components are omitted.

As to the second lateral surface 8, the convex section 8a thereof is provided between the fiber-coupling groove 14b and the filter-mounting groove 12 and the concave sections 8b thereof are disposed on the opposite sides of the convex section 8a. A part of the boundary line 22 between the second lateral surface 8 of the waveguide layer 4 and the exposed area 18 (or a step 18') of the substrate 2, i.e., an inner edge 22' of the concave section 8b extends in the light-propagating direction 10a and then is curved toward the transverse direction 10b. The convex section 8a does not reach the lateral surface 16 of the substrate 2; namely, the exposed area 18 or the step 18' of the substrate 2 is also provided between the convex section 8a and the lateral surface 16 of the substrate 2. The convex section 8a is preferably nearer the filter-mounting groove 12 than the fiber-coupling groove 14b.

A method of manufacturing the optical device 50 according to the second embodiment of the present invention and assembling the fiber F1 and the filter F2 thereinto is the same as that of manufacturing the optical device 1 according to the first embodiment of the present invention and assembling the fiber F1 and the filter F2 thereinto.

In the optical device 50 according to the second embodiment of the present invention, even if the fiber adhesive A1 overflows from the fiber-coupling groove 14b and then flows along the exposed area 18, the convex section 8a functions as a dam so that the fiber adhesive A1 can be prevented from flowing into the filter-mounting groove 12. The nearer the convex section 8a is to the filter-mounting groove 12, the greater an allowable amount of the overflowed fiber adhesive A1 is. Especially when the refractive indexes of the fiber adhesive A1 and the filter adhesive A2 are respectively selected to correspond to those of the core of the fiber F1 and the core 4a of the waveguide layer 4, a reflective return light of the optical device 50 can be prevented from increasing more than a design level thereof.

Figure 3:
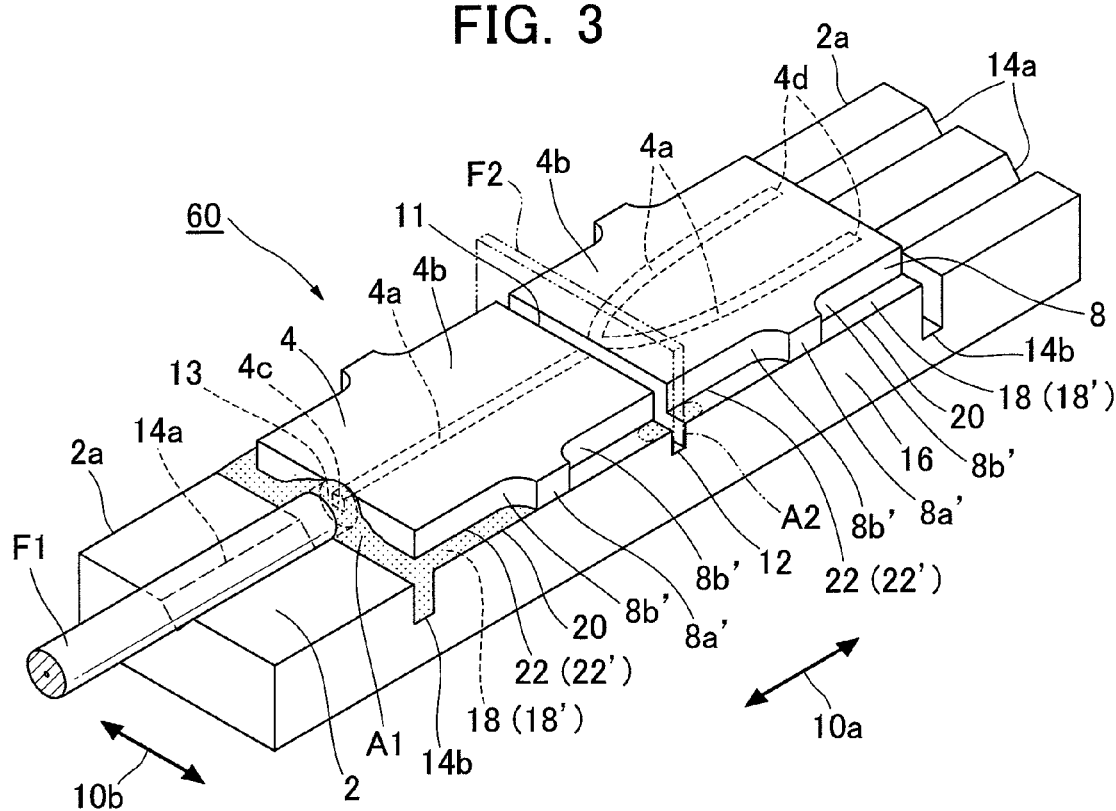
FIG. 3 is a perspective view of an optical device according to the third embodiment of the present invention.

Next, referring to FIG. 3, an optical device according to a third embodiment of the present invention will be explained. FIG. 3 is a perspective view of such an optical device according to the third embodiment of the present invention.

As shown in FIG. 3, an optical device 60 according to the third embodiment of the present invention has a structure similar to that of the optical device 1 according to the first embodiment of the present invention except that the second lateral surface 8 of the waveguide layer 4 has a concavo-convex configuration defined by a convex section 8a' and concave sections 8b'. In this connection, components of the optical device 60 according to the third embodiment similar to those of the optical device 1 according to the first embodiment thereof are indicated by the same reference numbers as those of the latter components, and thus explanations of the former components are omitted.

As to the second lateral surface 8, the convex section 8a' thereof is provided between the fiber-coupling groove 14b and the filter-mounting groove 12 and concave sections 8b' thereof are disposed on the opposite sides of the convex section 8a'. A part of the boundary line 22 between the second lateral surface 8 of the waveguide layer 4 and the exposed area 18 or a step 18' of the substrate 2, i.e., an inner edge 22' of the concave section 8b extends in the light-propagating direction 10a and then is curved toward the transverse direction 10b. The convex section 8a' reaches the lateral surface 16 of the substrate 2 and has a surface in the same plane as a plane in which the lateral surface 16 is located. Thus, the exposed area 18 or the step 18' is interrupted between the fiber-coupling groove 14b and the filter-mounting groove 12. A length of the convex section 8a' in the light-propagating direction 10a is preferably as short as possible, but is required to be enough not to be broken when the convex section 8a' is cut by a dicing blade.

A method of manufacturing the optical device 60 according to the third embodiment of the present invention and assembling the fiber F1 and the filter F2 thereinto is the same as that of manufacturing the optical device 1 according to the first embodiment of the present invention and assembling the fiber F1 and the filter F2 thereinto.

In the optical device 60 according to the third embodiment of the present invention, even if the fiber adhesive A1 overflows from the fiber-coupling groove 14b and then flows along the exposed area 18, the convex section 8a' functions as a dam so that the fiber adhesive A1 can be prevented from flowing into the filter-mounting groove 12. Since the convex section 8a' has the same plane as that in which the lateral surface 16 of the substrate 2 is located, when a wafer is cut by a dicing blade, the blade may contact the cladding 4b. However, by shortening a length of the convex section 8a' in the light-propagating direction, clogging of the dicing blade can be prevented sufficiently.

Figure 4:
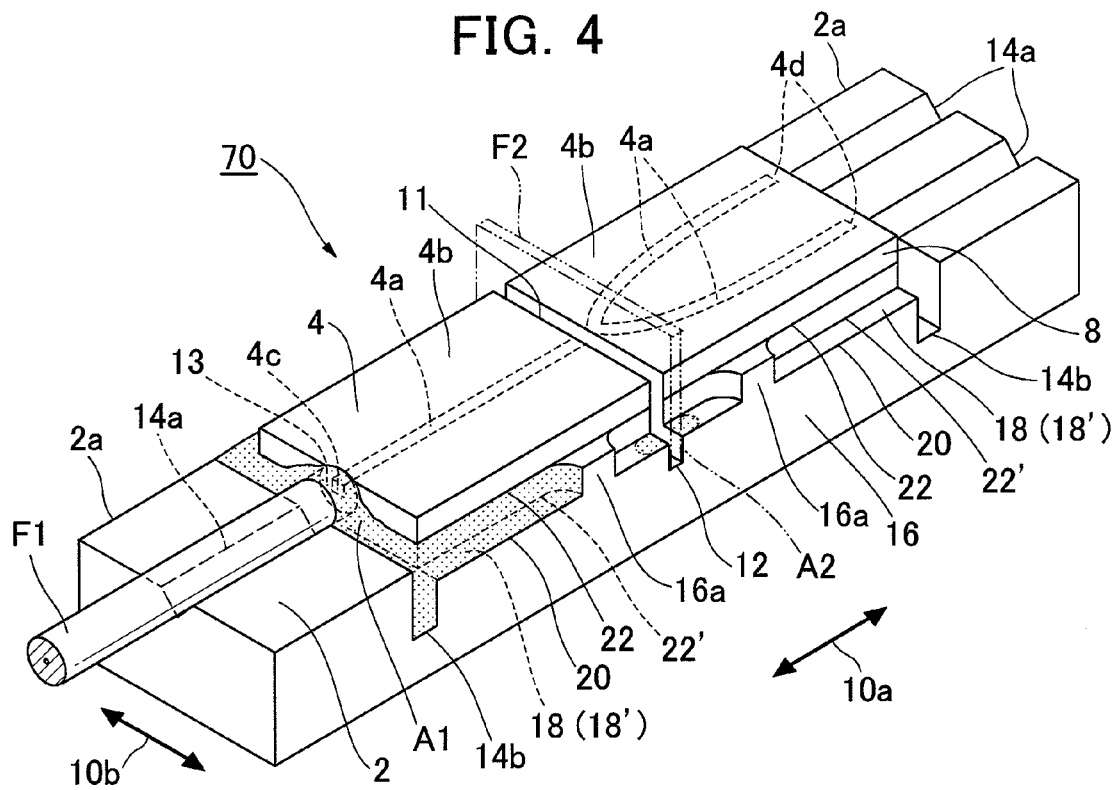
FIG. 4 is a perspective view of an optical device according to the fourth embodiment of the present invention.

Next, referring to FIG. 4, an optical device according to a fourth embodiment of the present invention will be explained. FIG. 4 is a perspective view of such an optical device according to the fourth embodiment of the present invention.

As shown in FIG. 4, an optical device 70 according to the fourth embodiment of the present invention has a structure similar to that of the optical device 1 according to the first embodiment of the present invention except that the exposed area 18 is lowered so that the lateral surface 16 of the substrate 2 is formed with a concavo-convex configuration. In this connection, components of the optical device 70 according to the fourth embodiment of the present invention similar to those of the optical device 1 according to the first embodiment thereof are indicated by the same reference numbers as those of the latter components, and thus explanations of the former components are omitted.

The lateral surface 16 has a convex section 16a provided between the fiber-coupling groove 14b and the filter-mounting groove 12, and the exposed area 18 is provided on the opposed sides of the convex section 16a to form a step or a concave section 18'. A part of an inner edge 22' of the step 18' extends in the light-propagating direction 10a and then is curved toward the transverse direction 10b. Further, the step 18' is interrupted between the fiber-coupling groove 14b and the filter-mounting groove 12.

A method of manufacturing the optical device 70 according to the fourth embodiment of the present invention and assembling the fiber F1 and the filter F2 thereinto is the same as that of manufacturing the optical device 1 according to the first embodiment of the present invention and assembling the fiber F1 and the filter F2 thereinto except that the exposed area 18 is formed by means of RIE and so on after the cladding 4b is removed.

Figure 5:
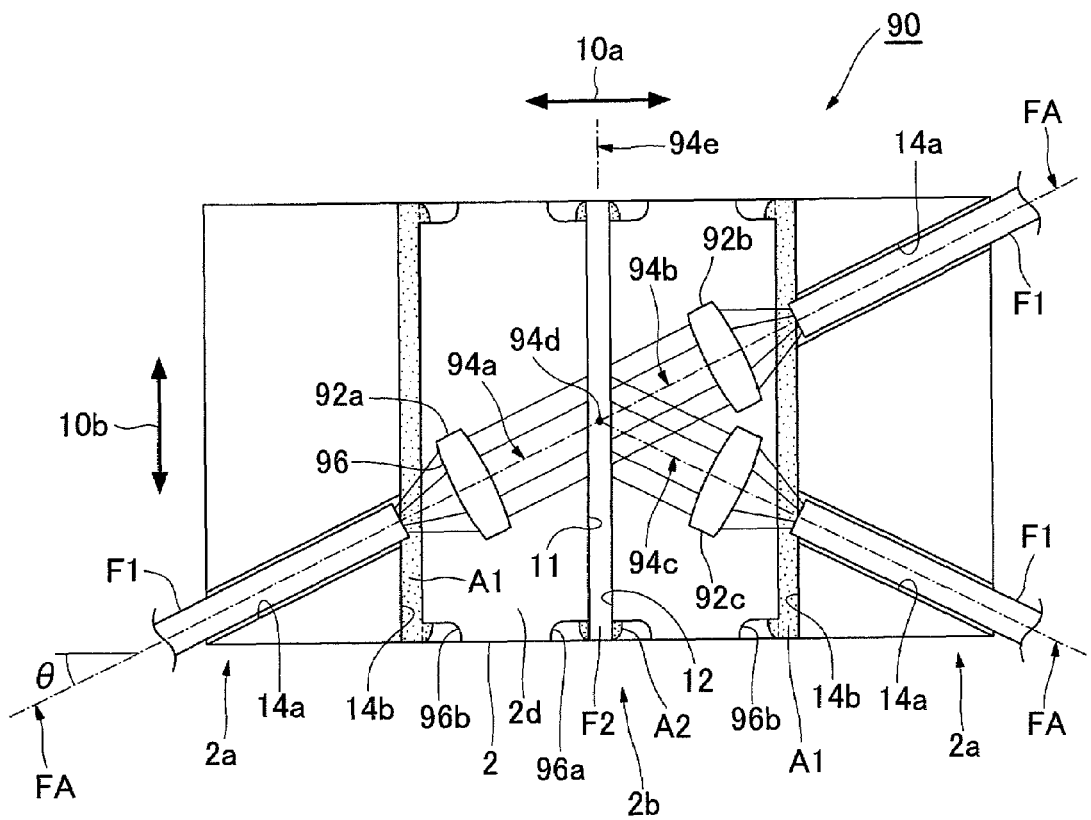
FIG. 5 is a perspective view of an optical device according to the fifth embodiment of the present invention.
Figure 6:
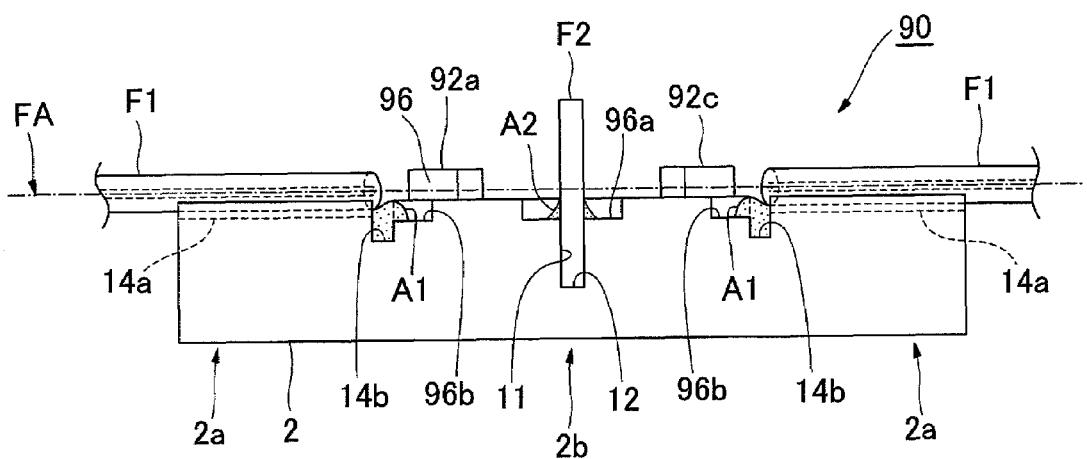
FIG. 6 is a front view of an optical device according to the fifth embodiment of the present invention.

Next, referring to FIGS. 5 and 6, an optical device according to a fifth embodiment of the present invention will be explained. The fifth embodiment can accomplish the second object of the present invention. FIG. 5 is a plan view of such an optical device according to the fifth embodiment of the present invention. FIG. 6 is a front view of the optical device shown in FIG. 5.

As shown in FIGS. 5 and 6, three lenses 92a, 92b, 92c are used in an optical device 90 instead of the optical waveguide layer 4 used in the optical device 1 according to the first embodiment of the present invention. In the optical device 90 shown in FIG. 5, optical fibers F1 and an optical filter F2 are mounted.

The substrate 2 extends in the light-propagating direction and the lenses 92a, 92b, 92c are laminated on the middle portion thereof, a material of the lenses 92a, 92b, 92c being the same as, for example, that of the cladding 4d of the optical waveguide 4 in the optical device 1 according to the first embodiment of the present invention. The substrate 2 has an upper surface 2d extending in the light-propagating direction 10a and the transverse direction 10b.

The lens 92a is disposed on one side of the middle portion 2b of the substrate 2, while the lenses 92b, 93b are disposed on the other side thereof. The lenses 92a, 92b, 93b have respective optical axes 94a, 94b, 94c. The optical axes 94a, 94b are coaxial with each other, extend straightly and intersect obliquely with the optical axis 94b at an cross angle θ.

Further, the substrate 2 is provided with a filter-mounting groove 12 extending across the substrate 2 in the transverse direction 10b for mounting the optical filter F2 therein. A filter adhesive A2 is used in the filter-mounting groove 12 to mount the filter F2 thereinto.

The filter adhesive A2 is generally a resin. Thus, a gap 11 between the filter F2 and the filter-mounting groove 12 defines a resin-filled portion 11 to be filled with a resin.

The substrate 2 has extended sections 2a extended on the opposed sides with respect to the middle portion 2b and each extended section 2a has optical-fiber mounting grooves 14a, 14b for mounting the fiber(s) F1. In the present embodiment, there are V-shaped grooves 14a each having a V-shaped cross section for positioning the fiber F1 to be aligned with the port 4c (4d), and fiber-coupling grooves 14b, each disposed at an end of the fiber F1 and extending in the transverse direction 10b. The fiber-coupling grooves 14b are located below respective optical coupling portions or locations (optical paths) between the lenses 92a, 92b, 92c and the fibers F1 and are close to the lenses 92a, 92b, 92c. In order to fix the fiber F1 to the substrate 2, a fiber adhesive A1 is used inside of the fiber-coupling groove 14b. The fiber adhesive A1 is preferably selected so that a refractive index of the fiber adhesive A1 is close to that of the core of the fiber F1. The substrate is preferably formed of silicon.

The fiber F1 on the one side of the optical device is disposed so that an optical axis FA of the fiber F1 is coaxial to an optical axis 94a of the lens 92a. The lens 92a is a convex lens having the optical axis 94a and being symmetrical relative to a plane perpendicular to the upper surface 2d, and is formed so that a focus point of the lens 92a is located at or near a tip of the fiber F1. In the present embodiment, four sides 96 of the lens 92a are surfaces substantially perpendicular to the upper surface 2d of the substrate 2.

Since a structure of the fiber F1 and the lenses 92b, 92c on the other side of the optical device is similar to that of the fiber F1 and the lens 92a on the one side of the optical device, an explanation of the former structure is omitted.

The fiber adhesive A1 is generally a resin. The fiber-coupling groove 14b defines a resin-filled portion 13 to be filled with a resin. It is not preferable that the fiber adhesive A1 be interposed between the fibers F1 and the lenses 92a, 92b, 92c.

Further, concave sections 96a, 96b respectively communicating with the resin-filled portion 11, 13 for storing the resin in such a state that the resin does not fill the concave sections are formed at respective ends of the filter-mounting groove 12 and the fiber-coupling groove 14b. Each of the concave sections 96a, 96b extends downward from the upper surface 2d of the substrate 2. The concave sections 96a, 96b are preferably disposed between the filter-mounting groove 12 and the fiber-coupling groove 14b. The concave sections 96a, 96b are preferably disposed below the optical path or therearound to prevent the excess resin from coming into the optical path of the optical device 90.

In the optical device 90, when a light is input into the fiber F1 on the one side of the optical device, the light expands from a tip of the fiber F1 to enter the lens 92a so that it becomes a parallel light when it exit the lens 92a. This parallel light is transmitted through the filter F2 and input into the lens 92b. After the light exit from the lens 92b, it is converged at a tip of the fiber F1 on the other side of the optical device, which tip is located at a focus point of the lens 92b, and then propagated to the fiber F1.

A method of manufacturing the optical device 90 according to the fifth embodiment of the present invention and assembling the fiber F1 and the filter F2 thereinto are the same as those of manufacturing the optical device 1 according to the first embodiment of the present invention and assembling the fiber F1 and the filter F2 thereinto except that the lenses 92a, 92b, 92c are formed instead of the waveguide layer 4. Thus, only parts of the method of the fifth embodiment different from that of the first embodiment will be explained; namely, explanations of the common parts of these methods, are omitted.

After the V-shaped grooves are formed, the lenses 92a, 92b, 92c are formed in the middle portion 2b of the substrate 2. Specifically, in case the lenses 92a, 92b, 92c are made of polymer material such as polyimide fluorite, the cladding layer is made by means of spin coating or molding. Then, the cladding layer is removed by means of a process such as photolithography, reactive ion etching or a mechanical way such as stamping so that portions corresponding to the lenses 92a, 92b, 92c remain to form the lenses 92a, 92b, 92c in a desired form.

In the optical device 90, after the filter adhesive A2 (uncured resin) is dropped into the filter-mounting groove 12, the filter adhesive A2 expands in the transverse direction 10b in the filter-mounting groove 12. Then, the filter adhesive A2 flows into the concave section 96a disposed at the end of the filter-mounting groove 12 rather than traveling along the lateral surface of the substrate, or travels along the lateral surface of the substrate to flow into the concave section 96b disposed at the end of the fiber-coupling groove 14b. Since the concave sections 96a, 96b do not have the function of allowing the uncured resin to travel far away, the filter adhesive A2 is prevented from entering the fiber-coupling groove 14b so that unnecessary expansion of the resin can be prevented. After the fiber adhesive A1 (uncured resin) is dropped into the fiber-coupling groove 14b, an operation of the fiber adhesive A1 is similar to that of the filter adhesive A2.

Further, after the fiber adhesive A1 (uncured resin) is dropped into the fiber-coupling groove 14b, the fiber adhesive A1 may be raised from the fiber-coupling groove 14b and then it flows into the concave section 96b. This can prevent a resin from being interposed between the fiber F1 and the lenses 92a, 92b, 92c.

Figure 7:
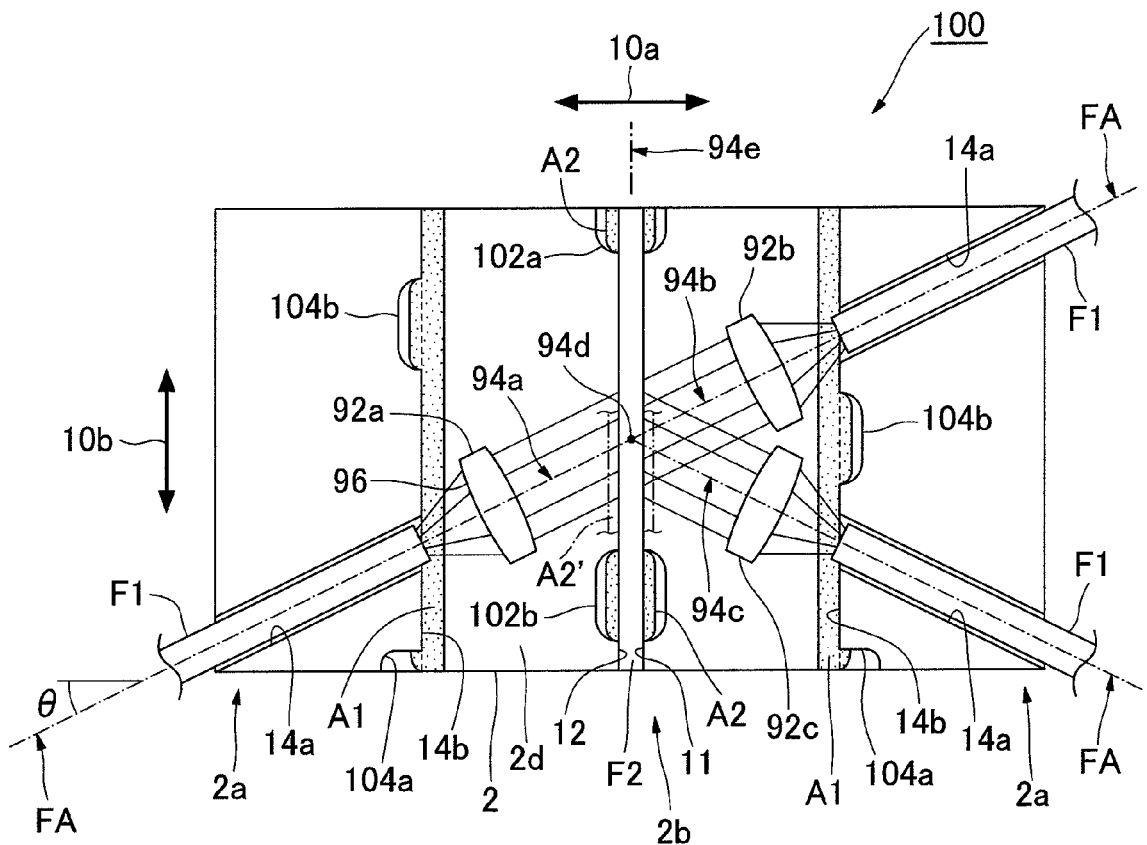
FIG. 7 is a perspective view of an optical device according to the sixth embodiment of the present invention.
Figure 8:
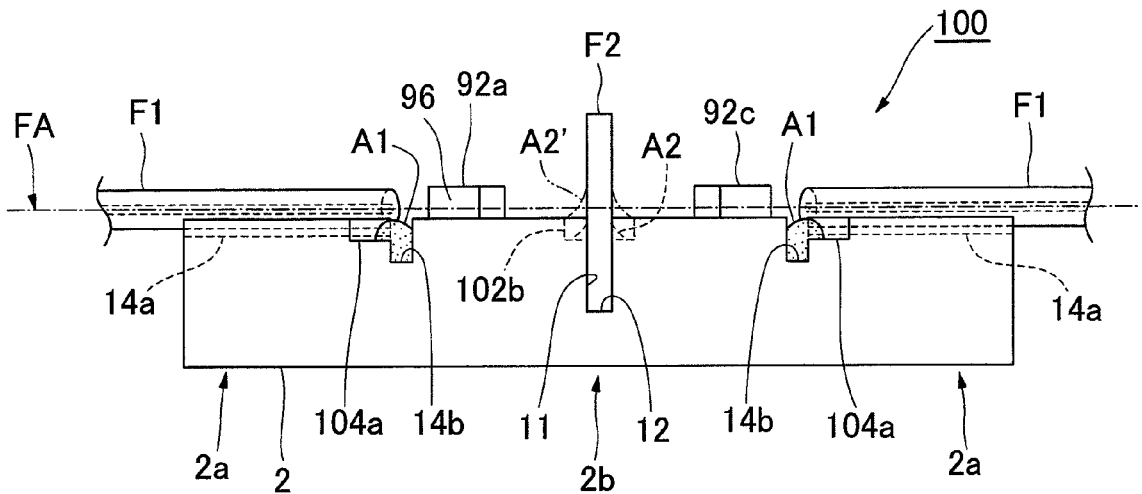
FIG. 8 is a front view of an optical device according to the sixth embodiment of the present invention.
Figure 9:
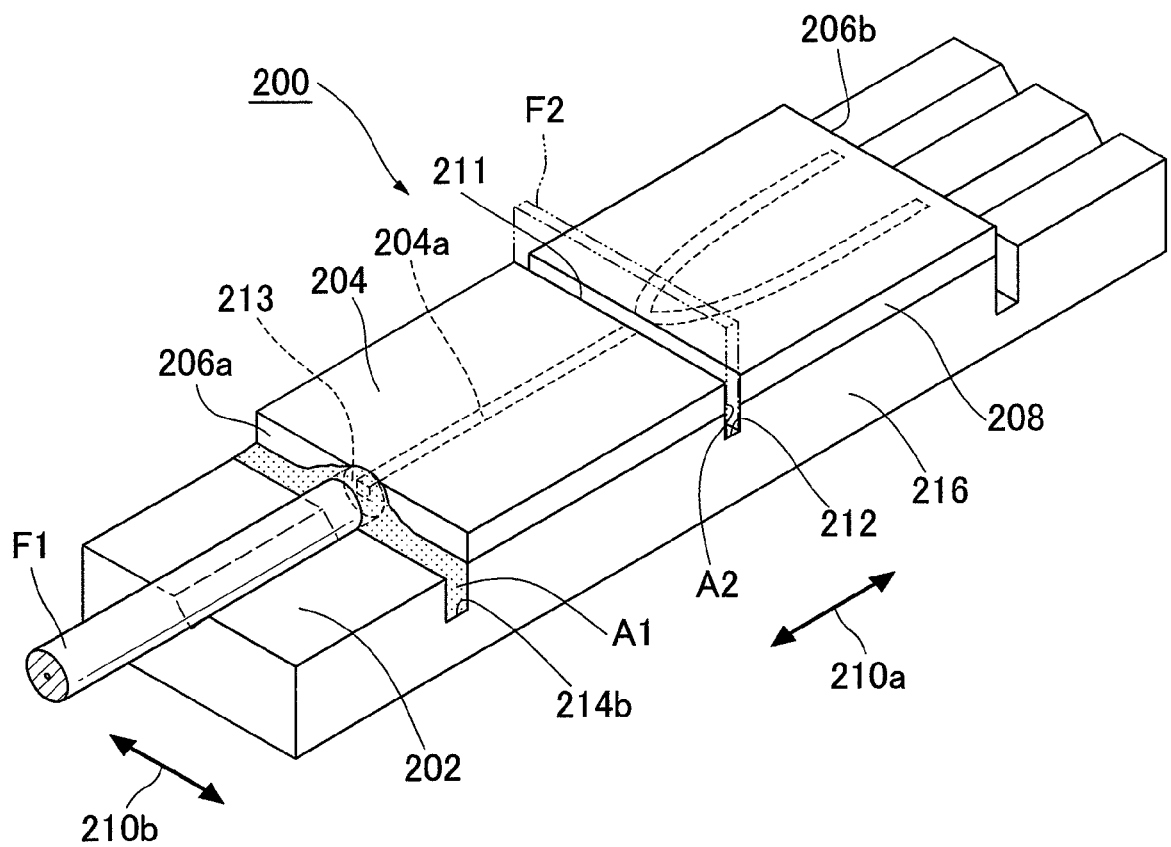
FIG. 9 is a perspective view of an optical device in the prior art.

Next, referring to FIGS. 7 and 8, a sixth embodiment of the optical device according to the present invention will be explained. The sixth embodiment can accomplish the second object of the present invention. FIG. 7 is a plan view of an optical device according to the sixth embodiment of the present invention. FIG. 8 is a front view of the optical device shown in FIG. 7.

As shown in FIGS. 7 and 8, an optical device 100 according to the sixth embodiment of the present invention has a structure similar to that of the optical device 90 according to the fifth embodiment of the present invention except that the positions of the concave sections 96a, 96b are varied. Thus, components of the optical device 100 according to the sixth embodiment of the present invention similar to those of the optical device 1 according to the fifth embodiment of the present invention are indicated by the same reference numbers as those of the latter components and thus explanations of the former components are omitted.

The filter-mounting groove 12 is provided with a concave section 102a at an end thereof and a concave section 102b in the middle thereof. The concave sections 102a, 102b communicate with a gap (resin-filled portion) 11 between the filter F2 and the filter-mounting groove 12, and extend downward from the upper surface 2d of the substrate 2 for storing the resin in such a state that the resin does not fill the concave section.

The fiber-coupling groove 14 is provided with a concave section 104a at an end thereof and a concave section 104b in the middle thereof. The concave sections 104a, 104b extend downwardly from the upper surface 2d of the substrate 2 for storing the resin flowing out from the fiber-coupling groove 14b.

The concave sections 102a, 102b, 104a, 104b are preferably provided below or near an optical path of the optical device 100 so that an excess resin is prevented from coming into the optical path.

A method of manufacturing the optical device 100 according to the sixth embodiment of the present invention and assembling the fiber F1 and the filter F2 thereinto is similar to that of manufacturing the optical device 90 according to the fifth embodiment of the present invention and assembling the fiber F1 and the filter F2 thereinto.

In the optical device 100, the filter adhesive A1 filled into a gap 11 between the filter F2 and the filter-mounting groove 12 for mounting the filter F2 thereinto is overflowed from the filter-mounting groove 12 onto the upper surface 2d of the substrate 2 so that, first, it is raised on the substrate once (please refer to A2' shown in FIG. 8). If the resin were cured in this state, a light output from the lens 92a would come into the raised filter adhesive A2' rather than the filter F2. However, since the filter adhesive A2 in the gap 11 subsequently flows into the concave sections 102a, 102b, the filter adhesive A2' overflowed from the filter-mounting groove 12 returns into the gap 11. Thus, unnecessary expansion of the resin can be prevented.

Further, after the fiber adhesive A1 (uncured resin) is dropped into the fiber-coupling groove 14b, the fiber adhesive A1 is raised from the fiber-coupling groove 14b, but it then flows into the concave sections 104a, 104b. This can prevent the resin from being interposed between the fiber F1 and the lenses 92a, 92b, 92c.

The embodiments of the present invention have been explained, but the present invention is not limited to the above-mentioned embodiments and it is apparent that the embodiments can be changed within the scope of the present invention set forth in the claims.

Although, in the above-stated embodiments, the optical devices 1, 50, 60, 70 were explained in a state in which they were just cut from a wafer, the optical devices according to the present invention may include an optical device on which an optical fiber F1 and/or an optical filter F2 is/are mounted.

Further, although, in the above-stated embodiments, the optical devices 90, 100 are provided with an optical fiber F1 and an optical filter F2, the optical device according to the present invention may include an optical device before one or both of the fiber F1 and the filter F2 is/are mounted thereon.

Further, in the second to fourth embodiments, the boundary line 22 or the inner edge 22' of the step 18' is curved from the light-propagating direction 10a toward the transverse direction 10b, but a direction thereof may be changed to any angle.

Further, in the second to fourth embodiments, the exposed area is provided on the opposite sides of the convex sections 8a, 8a', 16a, but the exposed area may be provided on just one side thereof.

Further, in the above-stated embodiments, the fiber is mounted on the optical device 1, but it may instead be mounted into an optical fiber array in which case the extended section 2a of the substrate 2 would have to be omitted.

Further, in the fifth embodiment, the concave sections 96a, 96b are provided at the end of the filter-mounting groove 12 and the fiber-coupling groove 14, but they may be provided intermediately between the filter-mounting groove 12 and the fiber-coupling groove 14.

The invention claimed is:

1. An optical device comprising:
    a substrate and an optical waveguide layer laminated thereon,
    wherein the optical waveguide layer has a first lateral surface connected to an optical fiber or an optical fiber array and a second lateral surface neither connected to the optical fiber or to the optical fiber array, the substrate has a lateral surface disposed on the same side as that of the second lateral surface of the optical waveguide layer, the second lateral surface of the optical waveguide layer is entirely retracted from a plane in which the lateral surface of the substrate is disposed so that an exposed area of the substrate is entirely formed between the second lateral surface of the optical waveguide layer and the lateral surface of the substrate, and the second lateral surface of the optical waveguide layer has a concave section and a convex section.

2. The optical device according to claim 1, wherein the exposed area of the substrate is interrupted by the convex section.

3. The optical device according to claim 1, wherein the substrate has, on the same side as that of the first lateral surface, a portion on which the optical waveguide layer is not laminated, and which is provided with a groove for mounting an optical fiber thereinto.

4. The optical device according to claim 1, wherein the optical waveguide layer is provided with a groove for mounting an optical filter thereinto.

5. The optical device according to claim 1, further comprising an optical filter.

6. The device according to claim 1, wherein the optical waveguide layer is a polymer layer.

* * * * *